US008490048B2

(12) United States Patent
Chandrasekharan et al.

(10) Patent No.: US 8,490,048 B2
(45) Date of Patent: Jul. 16, 2013

(54) APPARATUS, SYSTEM, AND METHOD FOR TOOL-BASED CREATION OF A HUB SERVER/APPLICATION INTERFACE

(75) Inventors: Sivakumar Chandrasekharan, Alameda, CA (US); Yury Kosov, San Francisco, CA (US); Zhengyuan Qiao, Burlingame, CA (US)

(73) Assignee: International Business Machines Corporation, Armonk, NY (US)

( * ) Notice: Subject to any disclaimer, the term of this patent is extended or adjusted under 35 U.S.C. 154(b) by 2006 days.

(21) Appl. No.: 11/378,084

(22) Filed: Mar. 17, 2006

(65) Prior Publication Data

US 2007/0220079 A1    Sep. 20, 2007

(51) Int. Cl.
 *G06F 9/44* (2006.01)
 *G06F 15/16* (2006.01)
(52) U.S. Cl.
 USPC ........... 717/106; 717/100; 719/328; 709/202; 709/203
(58) Field of Classification Search
 None
 See application file for complete search history.

(56) References Cited

U.S. PATENT DOCUMENTS

| | | | | |
|---|---|---|---|---|
| 5,454,109 A * | 9/1995 | Bruynooghe et al. | ........ | 717/100 |
| 6,816,865 B2 | 11/2004 | O'Brien et al. | ........... | 707/100 |
| 6,996,800 B2 * | 2/2006 | Lucassen et al. | ........... | 717/106 |
| 7,010,796 B1 * | 3/2006 | Strom et al. | ................. | 719/328 |
| 7,137,100 B2 * | 11/2006 | Iborra et al. | .................. | 717/106 |
| 7,373,632 B1 * | 5/2008 | Kawaguchi et al. | ......... | 717/100 |
| 7,392,307 B2 * | 6/2008 | Motoyama et al. | ........... | 709/224 |
| 7,458,082 B1 * | 11/2008 | Slaughter et al. | ............ | 719/328 |
| 7,958,487 B2 * | 6/2011 | Chandrasekharan et al. | | 717/106 |
| 8,327,319 B2 * | 12/2012 | Moosmann et al. | .......... | 717/104 |
| 8,365,138 B2 * | 1/2013 | Iborra et al. | .................. | 717/104 |
| 2003/0018830 A1 * | 1/2003 | Chen et al. | .................... | 709/328 |
| 2005/0071312 A1 | 3/2005 | Chau et al. | ...................... | 707/1 |
| 2005/0114394 A1 * | 5/2005 | Kaipa et al. | ............... | 707/104.1 |
| 2005/0216282 A1 * | 9/2005 | Chen et al. | ........................ | 705/1 |
| 2005/0229152 A1 * | 10/2005 | Connell et al. | ............... | 717/104 |
| 2009/0132995 A1 * | 5/2009 | Iborra et al. | ................ | 717/106 |
| 2011/0307548 A1 * | 12/2011 | Fisk et al. | .................... | 709/203 |

OTHER PUBLICATIONS

Gavin et al., WebSphere Business Integration Adapter Development: An Introduction to the Basics, IBM 2004 pp. 1-236.*
IBM WebSphere Business Integration Adapters Adapter Development Kit User Guide version 2.4.0 published 2003, pp. 1-13.*
IBM Business Object Development Guide Version 4.3.0, published 2004, pp. 1-312.*
Gavin et al., WebSphere Business Integration Adapters: An Adapter Development and WebSphere Business Integration Solution, published by IBM Redbooks, 2005, pp. 1-930.*

(Continued)

*Primary Examiner* — Tuan Q Dam
*Assistant Examiner* — Zheng Wei
(74) *Attorney, Agent, or Firm* — Kunzler Law Group, PC

(57) ABSTRACT

An apparatus, system, and method are disclosed for creating a hub server/application interface. An adapter development module and an object discovery agent development module receive an adapter developer input. The object discovery agent development module generates an object discovery agent project from the adapter developer input. The object discovery agent project specifies an object discovery agent that interacts with an application to specify a business object and includes an object discovery agent package, an object discovery agent message set, and an object discovery agent library. The adapter development module generates an adapter project. The adapter project specifies an interface between an application object of the application and the business object.

25 Claims, 7 Drawing Sheets

OTHER PUBLICATIONS

Brahim Medjahed et al. "Business-to-Business Interactions: Issues and Enabling Technologies" 2003, Springer-Verlag.

M. Kloppmann et al. "Business Process Choreography in Websphere: Combining the Power of BPEL and J2EE" 2004, IBM Systems Journal.

Casey Best et al. "Designing a Component-Based Framework for Visualization in Software Engineering and Knowledge Engineering" 2002—SEKE.

Olaf Zimmerman et al. "Second Generation Web Services-Oriented Architecture in Production in the Finance Industry" 2004, OOPSLA.

F. Budinsky et al. "Websphere Studio Overview" 2004, IBM Systems Journal.

J. Rapoza "E-trade Kit Integrates Business" *Abstract only*. 2003, VNU Business Publications.

* cited by examiner

APPARATUS, SYSTEM, AND METHOD FOR TOOL-BASED CREATION OF A HUB SERVER/APPLICATION INTERFACE

BACKGROUND OF THE INVENTION

1. Field of the Invention

This invention relates to creating an interface between processes and more particularly relates to creating a hub server/application interface.

2. Description of the Related Art

A hub server is often used to provide computing resources to a plurality of enterprise applications including web-based applications. For example, a hub server may be employed to host a web-based order management application, a data base application, and the like. The computing resources may include database resources, data storage resources, processing resources, and the like.

The hub server may integrate one or more applications on a common platform or across disparate platforms. The integration of the applications may allow the applications to share data, enhancing the usefulness of all applications. In integrating the applications, the hub server may provide the computing resources for applications that are written specifically to interface with the hub server. For example, a transaction processing application may be written specifically to interface with a specified hub server. In addition, the hub server may provide computing resources for applications that are not written to interface with the hub server. For example, the hub server may provide computing resources to an inventory management system that was written for use with a stand-alone inventory database.

In one embodiment, the hub server organizes computing resources as objects. The objects are referred to herein as business objects. Business objects are objects specifically designed to satisfy needs of one or more business processes. Business objects may comprise transactions or events including one or more functions and employing elements in a data structure, elements of a database schema, or the like. For example, a business object may include a function to search a database column for a specified identifier, and a function to retrieve a data value from the row of the identifier.

The business objects of the hub server may be named and organized differently from analogous objects of the applications interfacing with the hub server. In addition, business objects may be generic and used to interface with a plurality of applications. For example, a transaction processing application, a financial application, and an inventory management application may each use a generic finished goods inventory business object. The generic finished goods inventory object may include functions that sum data values in a database column for each application.

The hub server may employ an adapter agent to interface with an application. Adapter agents provide prepackaged connectivity that integrates disparate industry-specific and cross-industry computing systems by pulling and uniting information from packaged and custom applications; mainframe systems; technology protocols; databases; and trading partners. The adapter agent may convert generic hub server business objects into specific objects employed by an application. Similarly, the adapter agent may convert a specific application object into a generic business object for use by the hub server. For example, the adapter agent may convert an application object that retrieves a finished goods inventory value into the generic finished goods business object described above.

The hub server may employ an object discover agent ("ODA") to discover the objects associated with an application. In addition, the ODA may generate a generic business object that is equivalent to a discovered application data object. For example, the ODA may communicate with an application to discover the objects employed by the application. The ODA may further generate generic business objects, mapping hub server functions and data equivalent to the application objects. Thus, the ODA may create the business object/application object relationships that allow the adapter agent to interface between the hub server and the application.

Unfortunately, the ODA is typically written using a manual process. For example, a programmer may write the ODA source code, generate a run-time ODA, and test the ODA. Each of these operations traditionally takes place using separate and distinct tools and environments. While the programmer may refer to previously created ODA source code in writing new ODA source code, the programmer often omits code functions and parameters, fails to make important modifications, and may otherwise make mistakes developing the source code. Significant time and expense may be expended in discovering and correcting omissions and/or mistakes. Similarly, the adapter agent is also typically written using a manual process. And as with the ODA code, the programmer may also omit critical source code and otherwise make mistakes that increase the time and cost of creating the adapter agent.

From the foregoing discussion, it should be apparent that a need exists for an apparatus, system, and method that facilitate and automate the creation of an interface between an application and a hub server, including the ODA and adapter agent. Beneficially, such an apparatus, system, and method would reduce the time and cost of creating an ODA and an adapter agent.

SUMMARY OF THE INVENTION

The present invention has been developed in response to the present state of the art, and in particular, in response to the problems and needs in the art that have not yet been fully solved by currently available hub server/application interface creation methods. Accordingly, the present invention has been developed to provide an apparatus, system, and method for creating a hub server/application interface that overcome many or all of the above-discussed shortcomings in the art.

The apparatus to create a hub server/application interface is provided with a plurality of modules configured to functionally execute the steps of receiving an adapter developer input, generating an ODA project, and generating an adapter project. These modules in the described embodiments include an ODA development module and an adapter development module.

The ODA development module generates an ODA project from an adapter developer input. In one embodiment, an ODA template receives the adapter developer input. The ODA template may be configured to receive selections and parameters that specify an ODA. The ODA project comprises an ODA package, an ODA message set, and an ODA library. The ODA project specifies an ODA that interacts with an application to specify a business object for a hub server.

The adapter development module generates an adapter project from the adapter developer input. In one embodiment, an adapter template receives the adapter developer input. The adapter template may be configured to receive selections and parameters that specify an adapter agent. The adapter project specifies an interface between an application object of the application and the business object. The apparatus creates the ODA project and the adapter project directed to the interface between the application and the hub server.

A system of the present invention is also presented to create a hub server/application interface. The system may be embodied in a hub server with development suite. In particular, the system, in one embodiment, includes an application, a hub server, and a Websphere Business Integration ("WBI") adapter development suite from International Business Machines Corporation ("IBM") of Armonk, N.Y.

The hub server may be a server executing a WBI adapter framework produced by IBM. In addition, the hub server may store and manipulate one or more business objects. A business object may include data and functions for manipulating the data. In one embodiment, the hub server is a WBI Inter-Change Server produced by IBM.

The application may be a database application, an inventory management application, a transaction application, an accounting application, or the like. In one embodiment, the application executes on the hub server. In an alternate embodiment, the application executes on a separate server.

The WBI adapter development suite includes a plurality of modules for creating an interface between the hub server and the application. In one embodiment, the modules of the WBI adapter development suite execute on the hub server. In an alternate embodiment, the modules of the WBI adapter development suite execute on a computer workstation and/or server in communication with the hub server.

The WBI adapter development suite includes an ODA development module and an adapter development module. The ODA development module generates an ODA project from an adapter developer input. The adapter development module generates an adapter project from the adapter developer input. The WBI adapter development suite may also include an ODA code generation module, an ODA export module, an ODA debug module, an ODA message editor module, an adapter code generation module, an adapter export module, an adapter debug module, and an adapter message editor.

In one embodiment, the ODA code generation module generates ODA source code from the ODA project. The ODA export module may build and export the ODA source code as a run-time ODA. The ODA debug module may debug the run-time ODA. In one embodiment, the ODA message editor edits an ODA message.

The adapter code generation module may generate adapter source code from the adapter project. In one embodiment, the adapter export module builds and exports the adapter source code as a run-time adapter agent. The adapter debug module may debug the adapter agent. In a certain embodiment, the adapter message editor edits an adapter message. The system provides a development suite for creating an interface between the application and the hub server.

A method of the present invention is also presented for creating a hub server/application interface. The method in the disclosed embodiments substantially includes the steps to carry out the functions presented above with respect to the operation of the described apparatus and system. In one embodiment, the method includes receiving an adapter developer input, generating an ODA project, and generating an adapter project.

An adapter development module and/or an ODA development module receive an adapter developer input. The ODA development module generates an ODA project from the adapter developer input. The ODA project specifies an ODA that interacts with an application to specify a business object and includes an ODA package, an ODA message set, and an ODA library. The adapter development module generates an adapter project. The adapter project specifies an interface between an application object of the application and the business object. The method generates the ODA project and the adapter project for creating a hub server/application interface.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention generates an ODA project and an adapter project for creating a hub server/application interface. In addition, the embodiment of the present invention may generate a run-time ODA and a run-time adapter to support and create the hub server/application interface. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
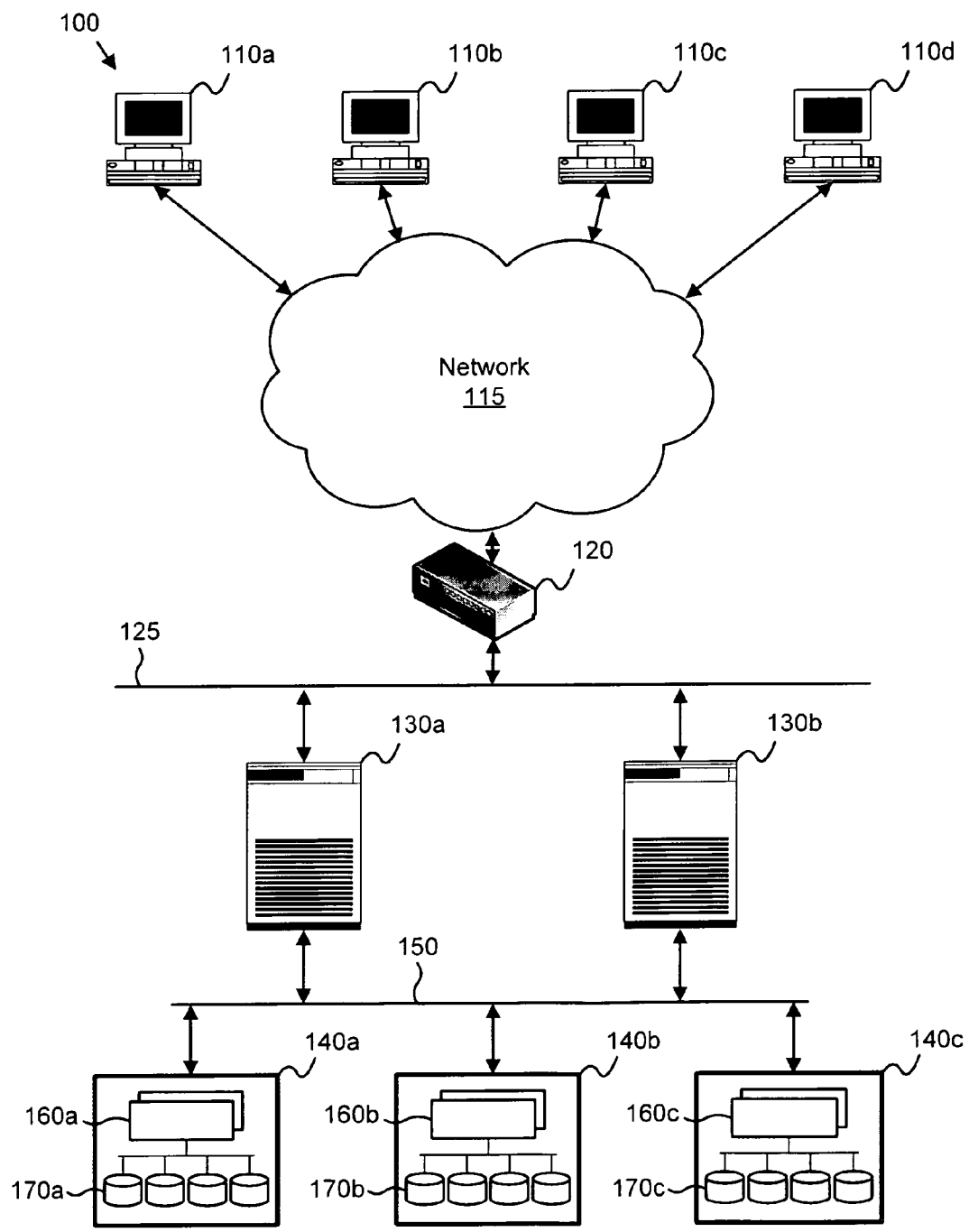
FIG. 1 is a schematic block diagram illustrating one embodiment of a data processing system in accordance with the present invention.

FIG. 1 is a schematic block diagram illustrating one embodiment of a data processing system 100 in accordance with the present invention. The system 100 includes one or more workstations 110, a network 115, a bridge 120, a local area network ("LAN") 125, one or more hub servers 130, a storage network 150, and one or more storage systems 140. In addition, each storage system 140 may include one or more storage controllers 160 and one or more storage devices 170.

The workstations 110 may be computer workstations, terminals, laptop computers, personal digital assistants, communication devices, or the like. The workstations 110 may communicate with the hub servers 130 through the network 115, the bridge 120, and the LAN 125 as is well known to those skilled in the art. Each hub server 130 may provide services for the workstations 110 and/or another hub server 130. The hub servers 130 may access the storage systems 140 through the storage network 150. In one embodiment, the storage network 150 and storage systems 140 are configured as a storage area network.

For example, the hub servers 130 may maintain one or more databases on the storage systems 140. The data of the databases may be stored on the storage devices 170 and be accessed using the storage controllers 160. In one embodiment, the hub servers 130 are WBI InterChange Servers produced by IBM of Armonk, N.Y. In addition, the hub servers 130 may execute the WBI Framework produced by IBM.

In a prophetic example, a first hub server 130a may maintain an inventory database on a first storage system 140. An accounting application may access the inventory database to, for example, determine a finished goods inventory. In one embodiment, the accounting application may execute on the first hub server 130a. Alternatively, the accounting application may execute on a second hub server 130b or on another connected server or computing system.

Continuing the prophetic example, the accounting application may be configured to interface directly with the first hub server 130a. Alternatively, the accounting application may not be configured to interface directly with the first hub server 130a. As a result, an interface is required to manage communications between the accounting application and the first hub server 130a. The embodiment of the present invention automates and facilitates the creation of a hub server 130/application interface using an adapter development suite.

Figure 2:
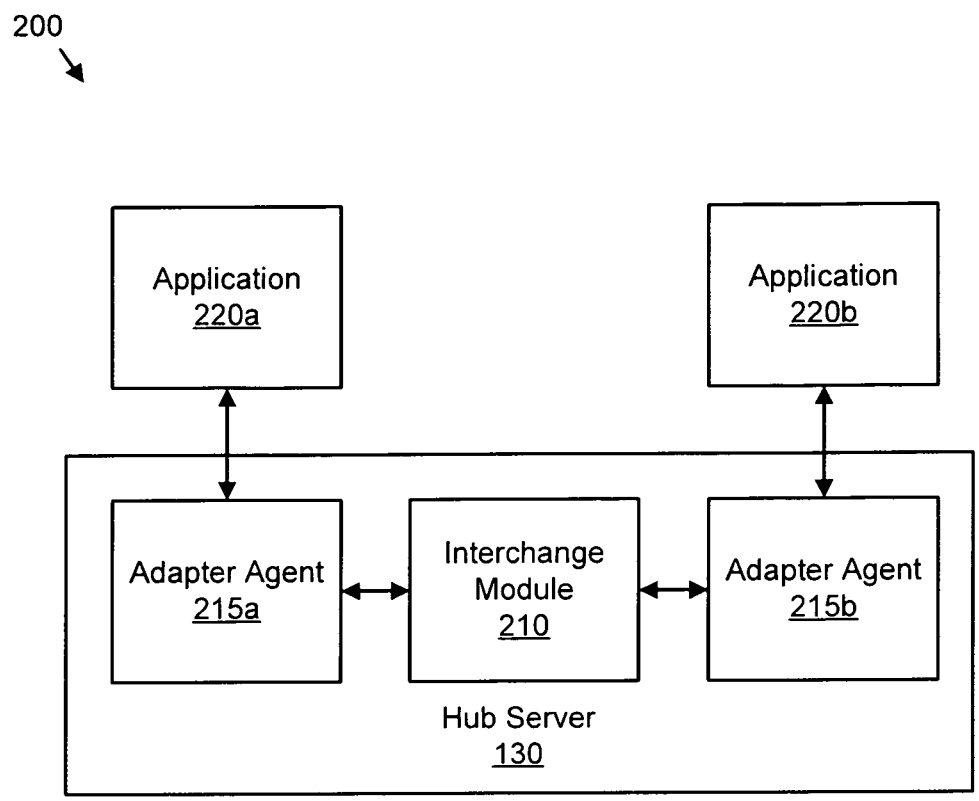
FIG. 2 is a schematic block diagram illustrating one embodiment of a hub server/application system of the present invention.

FIG. 2 is a schematic block diagram illustrating one embodiment of a hub server/application system 200 of the present invention. The system 200 includes the hub server 130 of FIG. 1 in communication with one or more applications 220. The description of the system 200 further refers to elements of FIG. 1, like numbers referring to like elements.

The hub server 130 is depicted executing an interchange module 210. In one embodiment, the interchange module 210 is the WBI Framework produced by IBM of Armonk, N.Y. The interchange module 210 may provide an application 220 access to one or more databases stored on one or more storage systems 140. In addition, the interchange module 210 may allow an application 220 to manipulate data in the databases.

Each application 220 communicates with the interchange module 210 through an adapter agent 215. The application 220 includes one or more application objects. Each application object comprises data and/or functions. The data may be data for a single record such as a database row, a plurality of records such as a data base column, or the like. The functions may be a structured query language ("SQL") function, an arithmetic function, a statistical function, or the like. In a prophetic example, the application object includes customer registration data and a function that creates a customer account for a customer from the customer registration data.

The adapter agent 215 employs an application program interface ("API") of the application 220 to communicate with the application 220. In a prophetic example, the application 220 may have a first API that provides an application object comprising an index value, index column name, a data column name, and an SQL SELECT function. In addition, the application 220 may have a second API that receives a value that corresponds to the index value, index column name, and data column name. Thus in a prophetic example, the application 220 may provide through the first API the index value '245456,' the column name 'Customer_ID,' and the data column name 'Phone_num' and may receive the value '(750) 123-4567' through the second API in response to the first API.

The interchange module 210 may include one or more business objects. Each business object may include one or more data attributes. In one embodiment, the data attributes are referred to as attributes. A data attribute may be a database schema column name, a column name and index value, a view name, or the like. A business object may also include one or more functions. In one embodiment, the functions are referred to as verbs. In a prophetic example, a business object function may determine the mathematical mean of values of a database schema column. In one embodiment, the business object may be configured as a flat object, with one array of data values. Alternatively, the business object may be hierarchical, wherein a parent array of data values is linked to one or more child arrays of data values.

The adapter agent 215 interfaces between the interchange module 210 and the application 220 by converting an application object of the application 220 into a business object of the interchange module 210 and by converting the business object into an application object. In one embodiment, an application API passes the application object to the adapter agent 215 and the adapter agent passes a business object converted from the application object to the interchange module 210. Similarly, the interchange module 210 may pass a business object to the adapter agent 215 and the adapter agent 215 may pass an application object converted from the business object to an API of the application 220.

Figure 3:
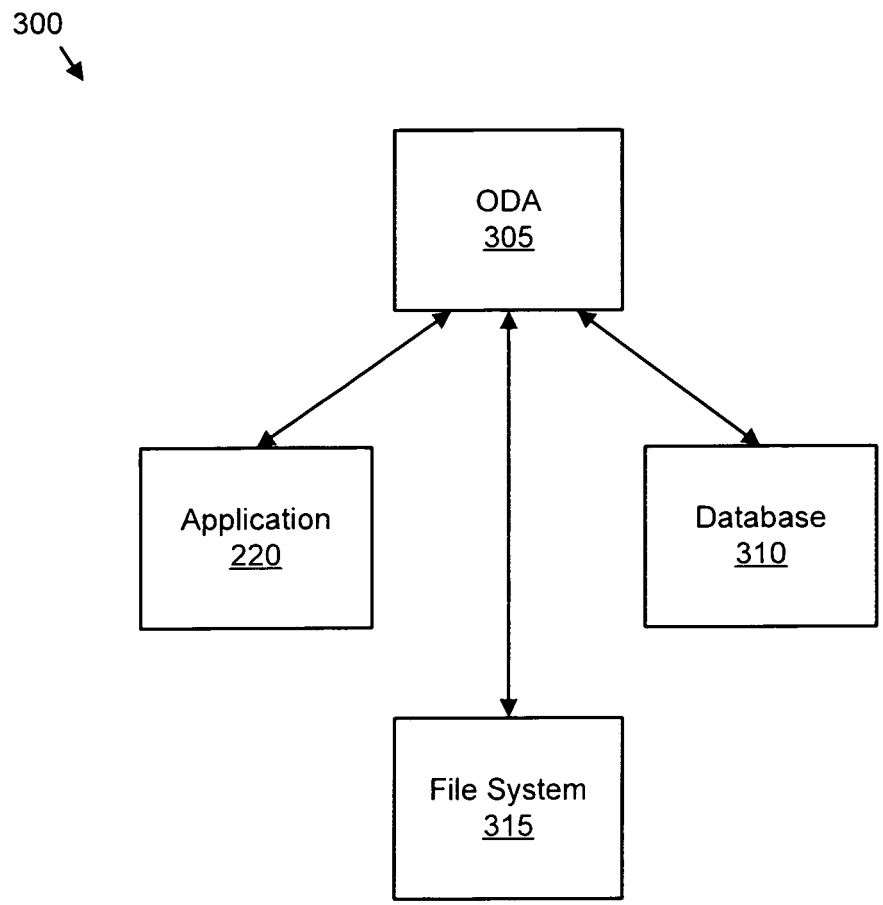
FIG. 3 is a schematic block diagram illustrating one embodiment of an ODA system of the present invention.

FIG. 3 is a schematic block diagram illustrating one embodiment of an ODA system 300 of the present invention. The system 300 includes an ODA 305, an application 220, a database 310, and a file system 315. In addition, the description of the system 300 refers to elements of FIGS. 1-2, like numbers referring to like elements.

The ODA 305 interacts with the application 220 and may interact with the database 310 and/or the file system 315 to specify a business object. The ODA 305 may interface to the application 220 and retrieve a list of data names, function names, and the like that are supported by the application 220. The ODA 305 may employ a name of the application 220, a user identifier of an account with access to the application 220, a password for the account, and the like to access the application 220. In addition, the ODA 305 may employ a table name, a schema name, a data value, or the like to retrieve the list of data names. Alternatively, the ODA 305 communicates with the application 200 using an API. In a prophetic example, the ODA 305 communicates the table name 'Customers' to the application 220 to receive a list of all column names associated with the 'Customers' table of the application 220.

In addition, the ODA 305 may communicate with the database 310 and/or the file system 315 to retrieve lists of data names and/or functions. In a prophetic example, the database 310 may reside on a storage system 140 of FIG. 1. The ODA 305 may communicate with the database 310 to receive a list of data names and/or functions of the database 310. In a certain embodiment, the ODA 305 communicates with the file system 315 to receive a list of directories, files, data stores, data names, and the like.

In one embodiment, the ODA 305 specifies a business object by mapping one or more data names and functions of the application 220 with one or more data names and functions of the database 310 and/or file system 315. In a prophetic example, the ODA 305 may specify a business object comprising the application data name 'Phone' mapped to the database data name 'Phon_num' along with an application retrieve function mapped to a database SQL SELECT function.

Figure 4:
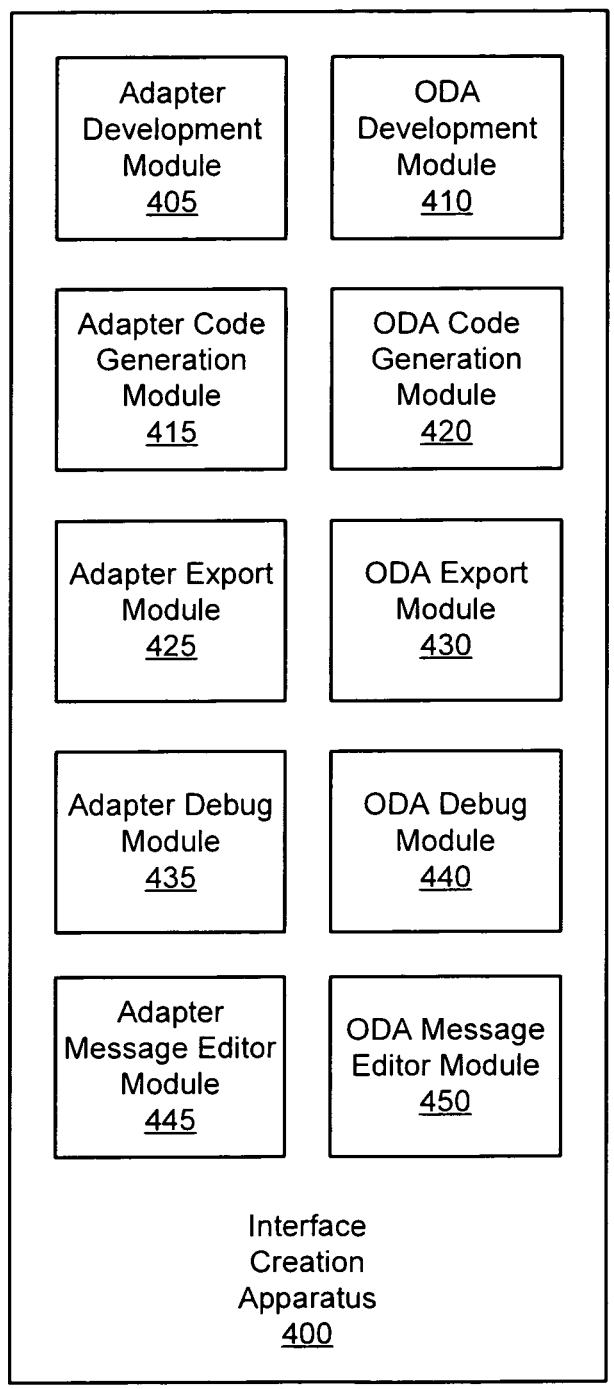
FIG. 4 is a schematic block diagram illustrating one embodiment of an interface creation apparatus of the present invention.

FIG. 4 is a schematic block diagram illustrating one embodiment of an interface creation apparatus 400 of the present invention. The apparatus 400 includes an adapter development module 405, an ODA development module 410, an adapter code generation module 415, an ODA code generation module 420, an adapter export module 425, an ODA export module 430, an adapter debug module 435, an ODA debug module 440, an adapter message editor 445, and an ODA message editor 450. In addition, the description of the apparatus 400 refers to elements of FIGS. 1-3, like numbers referring to like elements.

The apparatus 400 may be embodied by one or more software processes executing on a workstation 110 and/or hub server 130. In a certain embodiment, the apparatus 400 is embodied in software processes of the WBI Adapter Development Suite produced by IBM of Armonk, N.Y.

The ODA development module 410 generates an ODA project from an adapter developer input as will be described hereafter. The ODA project defines an ODA that interacts with an application 220 to specify a business object for a hub server that corresponds to a specific object of the application 220. The ODA project includes an ODA package, an ODA message set, and an ODA library. In one embodiment, the ODA package is configured as a Java programming language package. In an alternate embodiment, the ODA package is configured as a C++ programming language package. The ODA package may include metadata comprising one or more configuration property values such as application configuration properties and/or host server configuration properties. The metadata may be stored in files of a suitable format including extensible markup language ("XML"), XML schema definition ("XSD"), and the like.

The ODA message set includes messages that are communicated to an adapter developer. The messages may be communicated using an adapter development wizard. In a prophetic example, the ODA message set includes a message prompting the adapter developer to specify an application 220. In one embodiment, the ODA message set includes a plurality of messages for a plurality of human written languages. The ODA message set advantageously provides messages tailored to the particular interface for which the adapter is being developed.

The ODA library includes a plurality of software processes that are needed to implement the ODA 305. In one embodiment, the ODA library may be configured as a Java jar file comprising a plurality of Java software processes. Alternatively, the ODA library may be a C++ library. The ODA project specifies the ODA 305 that interacts with the application 220 to specify a business object.

In one embodiment, the ODA code generation module 420 generates ODA source code from the ODA project as will be described hereafter. In one embodiment, the ODA source code is Java source code. Alternatively, the ODA source code may be C++ source code, Java script, or the like.

The ODA export module 430 may build and export the ODA source code as a run-time ODA 305 as will be described hereafter. In one embodiment, the ODA export module 430 builds and exports an interpretable Java application. Alternatively, the ODA export module 430 builds and exports the run-time ODA 305 as an executable code such as processor specific code.

The ODA debug module 440 may debug the run-time ODA 305 as will be described hereafter. In one embodiment, the ODA debug module 440 records each operation of an executing ODA 305. In addition, the ODA debug module 440 may display a trace of one or more operations, including data values for data storage locations, processor registers, and the like. In a certain embodiment, the ODA message editor 450 edits an ODA message. In a prophetic example, the ODA message editor 450 may edit a prompt for a configuration property to include an explanatory note.

The adapter development module 405 generates an adapter project from the adapter developer input as will be described hereafter. The adapter project specifies an interface between an application object of the application 220 and the business object of the interchange module 210. The adapter project may include metadata comprising one or more configuration property values. In addition, the adapter project may include a plurality of adapter messages. The adapter messages may prompt the adapter developer to enter parameters, initiate operations, and the like in a development wizard, for example. The adapter project may also include an adapter library such as a Java jar library, a C++ library, a structured query language ("SQL") library, or the like.

The adapter code generation module 415 may generate adapter source code from the adapter project as will be described hereafter. In one embodiment, the adapter source code is interpretable Java source code. Alternatively, the adapter source code may be C++ source code, SQL source code, or the like.

In one embodiment, the adapter export module 425 builds and exports the adapter source code as a run-time adapter agent 215. In one embodiment, the adapter export module 425 builds and exports an executable script. Alternatively, the adapter export module 425 builds and exports the run-time adapter agent 215 as executable code such as processor specific code.

The adapter debug module 435 may debug the adapter agent 215. The adapter debug module 435 may record each operation of an executing adapter agent 215. In addition, the adapter debug module 435 may display a trace of one or more operations, including data values for data storage locations, processor registers, and the like. The adapter developer may employ the adapter debug module 435 to find and correct bugs in the adapter project.

In a certain embodiment, the adapter message editor 445 edits an adapter message. In a prophetic example, the adapter message editor 445 edits an adapter error message to include potential causes specific to a commonly used application 220. The apparatus 400 provides a development suite for creating the ODA 305 and the adapter agent 215 used to interface between the application 220 and the hub server 130.

By integrating the development functions of the adapter development module 405, ODA development module 410, adapter code generation module 415, ODA code generation module 420, adapter export module 425, ODA export module 430, adapter debug module 435, ODA debug module 440, adapter message editor 445, and ODA message editor 450 of the apparatus 400 into a single development suite, the embodiment of the present invention simplifies the process of developing, debugging, and maintaining the hub server 130/application 220 interface. The adapter developer may move seamlessly from development, through debugging, to deploying completed ODAs and adapter agents. The apparatus 400 maintains adapter developer inputs, metadata, source code, and run-time modules in a consistent environment that minimizes code maintenance tasks and improves development productivity. In addition, the integrated ODA debug module 440 and adapter debug module 435 may reduce the iterations required to produce debugged code by allowing the developer to quickly trap and examine errors. Thus the apparatus 400 speeds and improves the development of the hub server 130/application 220 interface over previous manual methods and methods using un-integrated tools.

Figure 5:
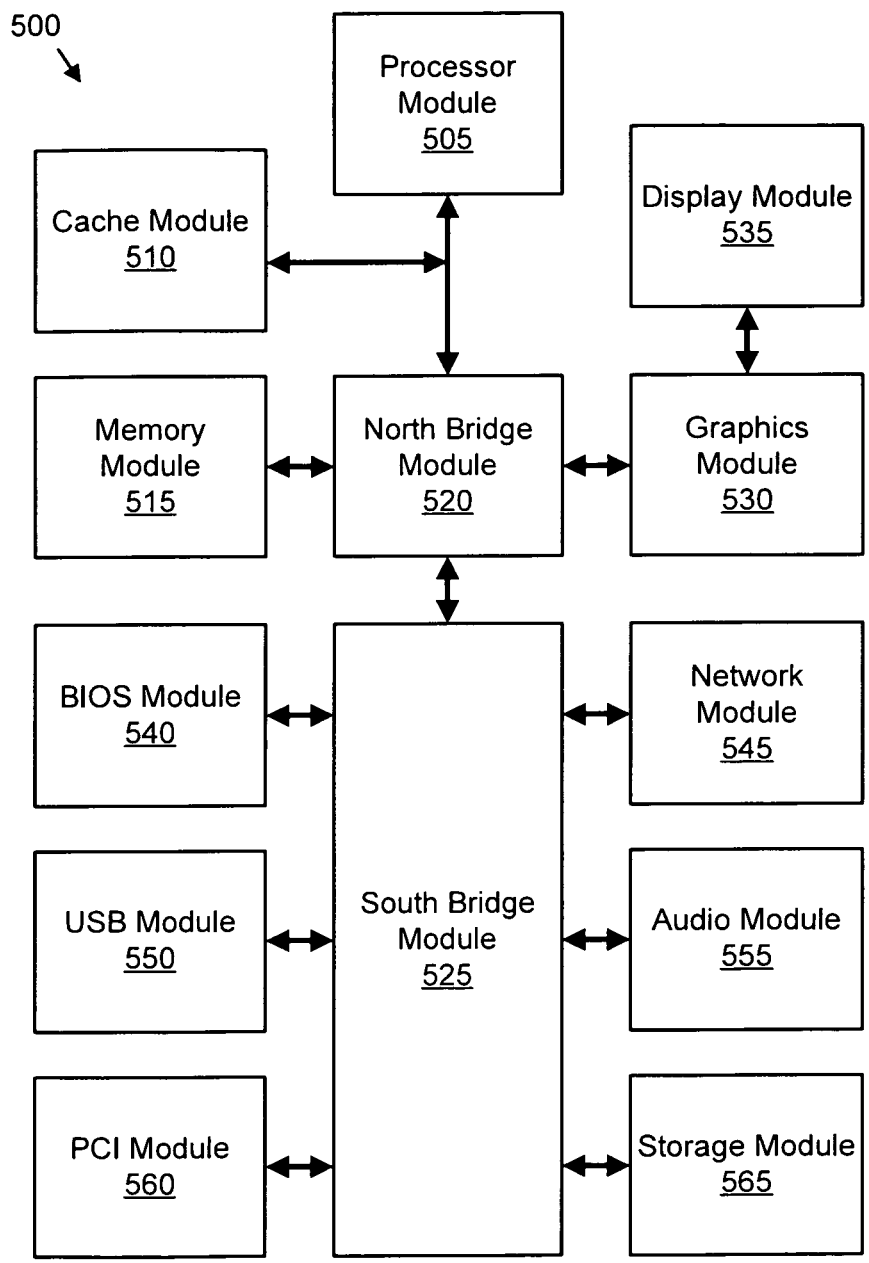
FIG. 5 is a schematic block diagram illustrating one embodiment of a computer in accordance with the present invention.

FIG. 5 is a schematic block diagram illustrating one embodiment of a computer 500 in accordance with the present invention. The computer 500 may be the workstation 110 and/or the hub server 130 of FIG. 1. As depicted, the computer 500 includes a processor module 505, a cache module 510, a memory module 515, a north bridge module 520, a south bridge module 525, a graphics module 530, a display module 535, a basic input/output system ("BIOS") module 540, a network module 545, a universal serial bus ("USB") module 550, an audio module 555, a peripheral component interconnect ("PCI") module 560, and a storage module 565. In addition, the description of the computer 500 refers to elements of FIGS. 1-4, like numbers referring to like elements.

The processor module 505, cache module 510, memory module 515, north bridge module 520, south bridge module 525, graphics module 530, display module 535, BIOS module 540, network module 545, USB module 550, audio module 555, PCI module 560, and storage module 565, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 515 stores software instructions and data. The processor module 505 executes the software instructions and manipulates the data as is well know to those skilled in the art. In one embodiment the processor module 505 executes and the memory module 515 stores one or more software processes that embody the adapter development module 405, ODA development module 410, adapter code generation module 415, ODA code generation module 420, adapter export module 425, ODA export module 430, adapter debug module 435, ODA debug module 440, adapter message editor 445, and ODA message editor 450 of FIG. 4.

The schematic flow chart and process diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
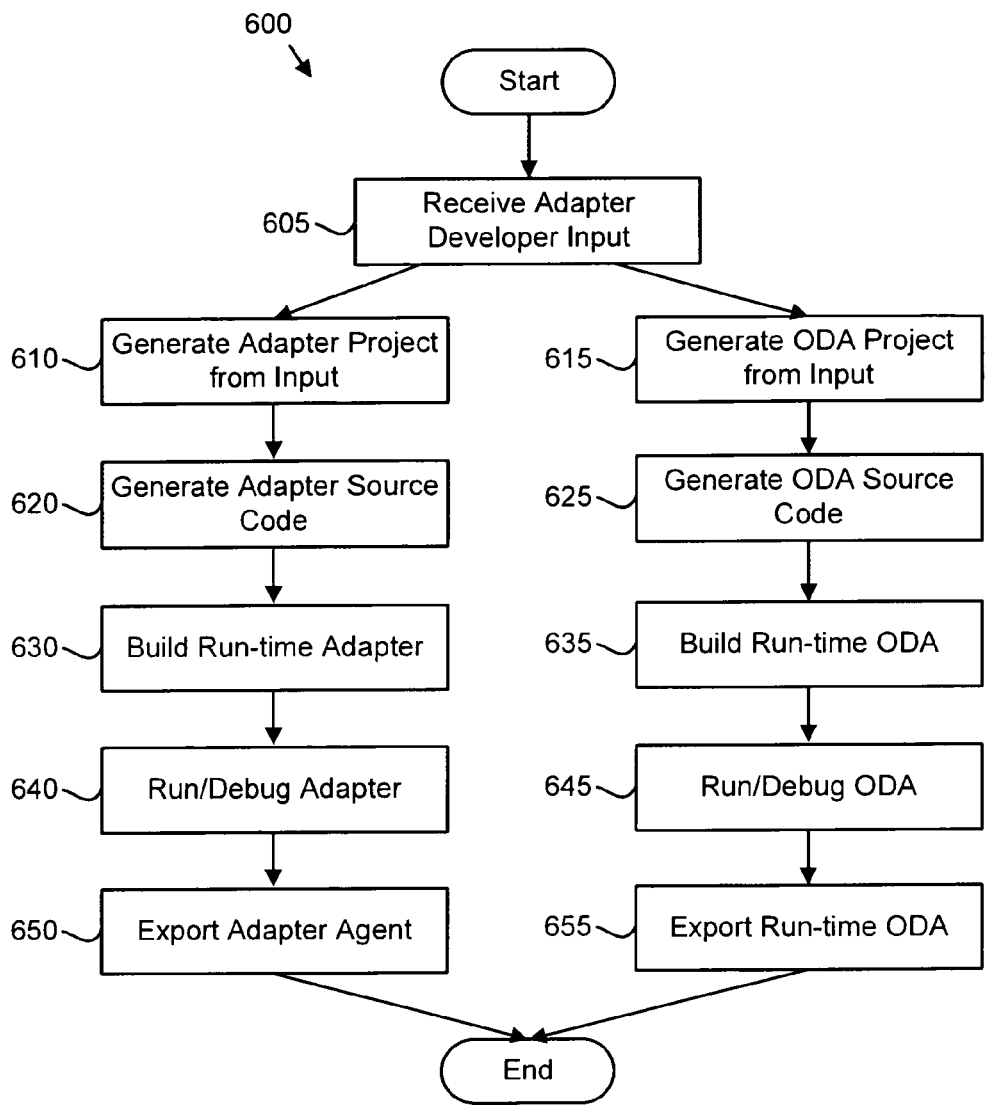
FIG. 6 is a schematic flow chart diagram illustrating one embodiment of a interface creation method in accordance with the present invention.

FIG. 6 is a schematic flow chart diagram illustrating one embodiment of an interface creation method 600 in accordance with the present invention. The method 600 substantially includes the steps to carry out the functions presented above with respect to the operation of the described system 100, 200, 300 and apparatus 400, 500 of FIGS. 1-5. In addition, the description of the method 600 refers to elements of FIGS. 1-5, like numbers referring to like elements.

The method 600 begins and the adapter development module 405 and/or the ODA development module 410 receive 605 an adapter developer input. In one embodiment, the ODA development module 410 includes an ODA template. The ODA template may be configured to receive selections and parameters that specify an ODA 305. In addition, the ODA template may receive 605 the adapter developer input. In a prophetic example, the ODA template receives 605 the name of a target application 220.

The ODA development module 410 generates 615 an ODA project from the adapter developer input. In one embodiment, the ODA development module 410 creates the ODA package. In addition, the ODA development module 410 may associate one or more ODA messages from an ODA message file with the ODA project. The ODA development module 410 may also associate an ODA library with the ODA project. The ODA library may be a standard library. Alternatively, the ODA library may be an ODA specific library. The ODA development module 410 may also create one or more metadata statements in response to the adapter developer input.

In one embodiment, the ODA code generation module 420 generates 625 ODA source code from the ODA project. In a prophetic example, the ODA code generation module 420 creates one or more ODA source code segments from one or more metadata values and/or for one or more configuration properties.

In one embodiment, the ODA export module 430 builds 635 a run-time ODA 305 from the ODA source code. In a prophetic example, the ODA export module 430 builds 635 the ODA source code into interpretable Java code.

In one embodiment, the ODA debug module 440 debugs 645 the ODA 305. In a prophetic example, the adapter developer may employ the ODA debug module 440 to execute the ODA 305 and monitor the execution of the ODA 305. The adapter developer may make modifications to the ODA project in response to the monitored execution.

In one embodiment, the ODA export module 430 exports 655 the run-time ODA 305. In a prophetic example, the ODA export module 430 exports an interpretable Java ODA 305 and one or more data files that may include a message file along with one or more Java beans from the ODA library.

In one embodiment, the adapter development module 405 includes an adapter template. The adapter template may be configured to receive selections and parameters that specify an adapter agent 215. In addition, the adapter template may receive 605 the adapter developer input. In a prophetic example, the adapter template receives 605 one or more business object names from the adapter developer.

The adapter development module 405 generates 610 an adapter project from the adapter developer input. In one embodiment, the adapter development module 410 may associate one or more adapter messages with the adapter project and associate an adapter library with the adapter project. In addition, the adapter development module 405 may generate metadata from the adapter developer input. In the prophetic example above, the adapter development module 410 creates a metadata statement for each business object name.

The adapter code generation module 415 may generate 620 adapter source code from the adapter project. In a prophetic example, the adapter code generation module 415 creates one or more adapter source code segments from one or more metadata values and/or for one or more configuration properties.

In one embodiment, the adapter export module 425 builds 630 a run-time adapter agent 215 from the adapter source code. In a prophetic example, the adapter export module 425 builds 630 the adapter source code into an encapsulated, interpretable Java file.

In one embodiment, the adapter debug module 440 debugs 640 the adapter agent 215. In a prophetic example, the adapter developer may employ the adapter debug module 435 to execute and monitor the execution of the adapter agent 215, and may make modifications to the adapter project in response to the monitored execution.

In one embodiment, the adapter export module 425 exports 650 the run-time adapter agent 215 and the method 600 terminates. In a prophetic example, the adapter export module 425 exports 650 an executable Java agent adapter 215 and one or more data files that may include an adapter message file along with the adapter library comprising a Java jar.

The method 600 generates the ODA project and the adapter project for creating a hub server 130/application 220 interface. In addition, the method 600 generates source code, builds run-time modules, debugs, and exports the run-time adapter agent 215 and run-time ODA 305.

Figure 7:
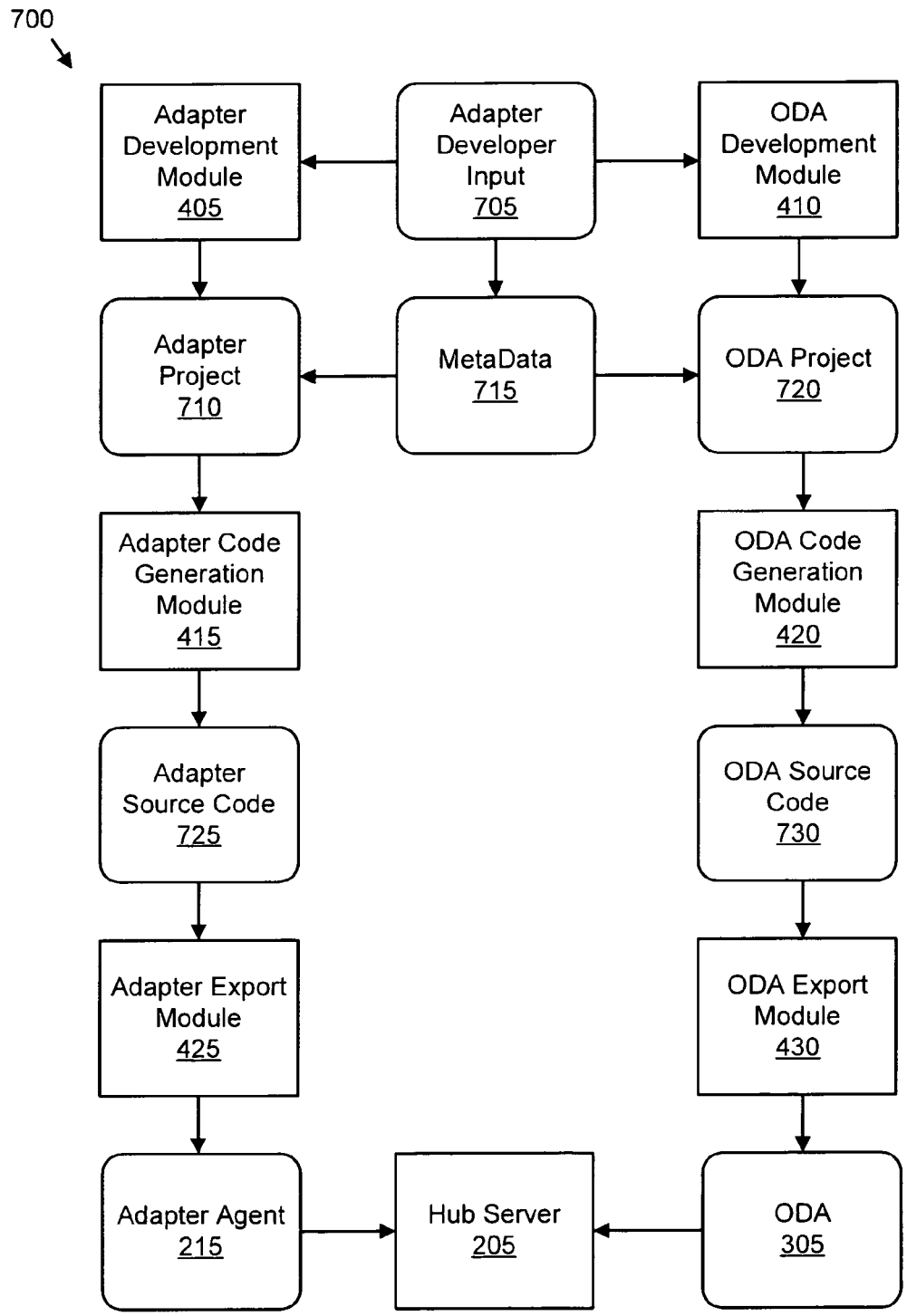
FIG. 7 is a schematic process flow diagram illustrating one embodiment of an interface creation process in accordance with the present invention.

FIG. 7 is a schematic process flow diagram illustrating one embodiment of an interface creation process 700 in accordance with the present invention. The process 700 depicts the origin and use of an adapter developer input 705, adapter project 710, metadata 715, ODA project 720, adapter source code 725, ODA source code 730, as well as the adapter agent 215 and the ODA 305. In addition, the process 700 substantially includes the flow of the functions presented above with respect to the operation of the described system 100, 200, 300, apparatus 400, 500, and method 600 of FIGS. 1-6. The description of the process 700 refers to elements of FIGS. 1-6, like numbers referring to like elements.

The adapter development module 405 and ODA development module 410 receive 605 the adapter developer input 705. In one embodiment, the adapter development module 405 receives 605 the adapter developer input 705 through an adapter template. The adapter template may be an extensible markup language ("XML") form as is well known to those skilled in the art. The ODA development module 410 may also receive 605 the adapter developer input 705. In addition, the ODA development module 410 may receive 605 the adapter developer input 705 through an ODA template. The ODA template may also be configured as an XML form.

In one embodiment, the adapter developer input 705 creates metadata. In a prophetic example, adapter developer input 705 specifying a name of an application 220 may be stored as metadata 715 in an XML form such as the adapter template and/or the ODA template. The XML form with entries may embody the metadata 715.

The ODA development module 410 generates 615 the ODA project 720 from the adapter developer input 705 and/or the metadata 715. In a prophetic example, the ODA project 720 specifies a name of an application 220, a logical address for the application 220, a user name for the application, a password associated with the user name, and a data type such as character data. The ODA development module 410 may also provide an ODA library, one or more ODA messages, and an ODA package for the ODA project 720.

The ODA code generation module 420 may generate 525 ODA source code 730 from the ODA project 720. In addition, the ODA export module 430 may export 655 a run-time ODA 305 based on the ODA source code 730. In a prophetic example, the ODA export module 430 may export 655 a run-time Java ODA 305. In one embodiment, the ODA 305 executes on the hub server 130 to specify a business object. In a certain embodiment, the metadata 715 may include the business object.

The adapter development module 405 generates 610 the adapter project 710 from the adapter developer input 705 and/or metadata 715. Continuing the prophetic example above, the adapter development module 405 may generate 610 the adapter project 710 from the metadata 715 described above including the name of the application 220, application logical address, user name, and password. In addition, the adapter development module 405 may generate the adapter project 710 using the business object specified by the ODA 305.

The adapter code generation module 415 may generate 620 adapter source code 725 from the adapter project 710. In one embodiment, the adapter code generation module 415 may generate 620 the adapter source code 725 by translating specified configuration properties and metadata 715 into source code. In a prophetic example, the adapter code generation module 415 translates the application logical address and the business object into an API function call for the application 220.

In one embodiment, the adapter export module 425 exports 650 the adapter agent 215 from the adapter source code 725. In one embodiment, the adapter export module 425 encapsulates interpretable Java code from the adapter source code 725 as a run-time adapter agent 215. Alternatively, the adapter export module 425 may compile the adapter source code 725 and link the complied adapter source code 725 with one or more functional modules from the adapter library. The hub server 205 may execute the adapter agent 215, wherein the adapter agent 215 interfaces between the application 220 and the hub server 205.

The embodiment of the present invention generates an ODA project 720 and an adapter project 710 for creating a hub server/application interface. In addition, the embodiment of the present invention may generate a run-time ODA 305 and a run-time adapter agent 215 to support and create the hub server/application interface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to create a hub server/application interface, the apparatus comprising:
a storage device storing executable code;
a processor executing the executable code, the executable code comprising:
an object discovery agent ("ODA") development module integrated in an adapter development wizard and generating an ODA project from an adapter developer input comprising a name of a target application and a name of a business object, and metadata comprising configuration properties for the target application and configuration properties for a hub server by receiving the adapter developer input and the metadata at an ODA template of the ODA project, wherein the ODA project generates from the ODA template an ODA that interacts with the target application to specify the business object for the hub server; and
an adapter development module integrated in the adapter development wizard and generating an adapter project from the adapter developer input and the metadata by receiving the adapter developer input and the metadata at an adapter template and generating a metadata statement for the business object name from the adapter template, wherein the adapter project specifies an interface between an application object of the target application and the business object, the ODA project and the adapter project sharing the metadata.

2. The apparatus of claim 1, wherein the hub server is an International Business Machines Corporation ("IBM") Websphere Business Integration ("WBI") InterChange Server.

3. The apparatus of claim 1, wherein the metadata specifies the target application and the hub server for the ODA project and the adapter project.

4. The apparatus of claim 3, further comprising an ODA code generation module generating ODA source code from the ODA project, building and exporting a run-time ODA from the ODA source code, debugging the run-time ODA, generating adapter source code from the adapter project, building and exporting a run-time adapter agent from the adapter source code, and debugging the adapter agent.

5. A computer program product comprising a storage device storing executable code executed by a processor to create a hub server/application interface, the operations of the computer program product comprising:
receiving an adapter developer input comprising a name of a target application and a name of a business object, and metadata comprising configuration properties for the target application and configuration properties for a hub server;
generating, using an adapter development wizard, an object discovery agent ("ODA") project from the adapter developer input and metadata by receiving the adapter developer input and the metadata at an ODA template of the ODA project and generating from the ODA template an ODA that interacts with the target application to specify the business object for the hub server; and
generating, using the adapter development wizard, an adapter project from the adapter developer input and the metadata by receiving the adapter developer input and the metadata at an adapter template and generating a metadata statement for the business object name from the adapter template, wherein the adapter project specifies an interface between an application object of the target application and the business object, the ODA project and the adapter project sharing the metadata.

6. The computer program product of claim 5, the operations of the computer program product further comprising generating ODA source code from the ODA project.

7. The computer program product of claim 6, the operations of the computer program product further comprising building and exporting a run-time ODA from the ODA source code and debugging the run-time ODA.

8. The computer program product of claim 7, the operations of the computer program product further comprising generating adapter source code from the adapter project.

9. The computer program product of claim 8, the operations of the computer program product further comprising building and exporting a run-time adapter agent from the adapter source code and debugging the adapter agent.

10. The computer program product of claim 9, wherein the ODA source code and the adapter source code utilize a software language selected from Java and C++.

11. The computer program product of claim 5, wherein the hub server is an International Business Machines Corporation ("IBM") Websphere Business Integration ("WBI") InterChange Server.

12. The computer program product of claim 5, wherein the metadata specifies the target application and the hub server for the ODA project and the adapter project.

13. The computer program product of claim 5, wherein the adapter agent is a J2EE Java 2 platform Enterprise Edition connector.

14. A system to create a hub server/application interface, the system comprising:
   a target application;
   a hub server executing a Websphere Business Integration ("WBI") adapter framework;
   a WBI adapter development tool suite comprising
   an object discovery agent ("ODA") development module integrated in an adapter development wizard and generating an ODA project from an adapter developer input comprising a name of the target application and a name of a business object, and metadata comprising configuration properties for the target application and configuration properties for the hub server by receiving the adapter developer input and the metadata at an ODA template of the ODA project, wherein the ODA project generates from the ODA template an ODA that interacts with the target application to specify the business object for the WBI adapter framework; and
   an adapter development module integrated in the adapter development wizard and generating an adapter project from the adapter developer input and the metadata by receiving the adapter developer input and the metadata at an adapter template and generating a metadata statement for the business object name from the adapter template, wherein the adapter project specifies an interface between an application object of the target application and the business object, the ODA project and the adapter project sharing the metadata.

15. The system of claim 14, further comprising an ODA code generation module that generates ODA source code from the ODA project, an ODA export module that builds and exports the ODA source code as a run-time ODA, and an ODA debug module that debugs the run-time ODA.

16. The system of claim 15, further comprising an adapter code generation module that generates adapter source code from the adapter project, an adapter export module that builds and exports the adapter source code as a run-time adapter agent, an adapter debug module that debugs the adapter agent, and an adapter message editor that edits an adapter message.

17. A method for creating a hub server/application interface, the method comprising:
   receiving, by use of a processor, an adapter developer input comprising a name of a target application and a name of a business object, and metadata comprising configuration properties for the target application and configuration properties for a hub server;
   providing the adapter developer input to a Websphere Business Integration ("WBI") adapter development tool suite comprising
   an object discovery agent ("ODA") development module integrated in an adapter development wizard and generating an ODA project from the adapter developer input and the metadata by receiving the adapter developer input and the metadata at an ODA template of the ODA project, wherein the ODA project generates from the ODA template an ODA that interacts with the target application to specify the business object for the WBI adapter framework; and
   an adapter development module integrated in the adapter development wizard and generating an adapter project from the adapter developer input and the metadata by receiving the adapter developer input and the metadata at an adapter template and generating a metadata statement for the business object name from the adapter template, wherein the adapter project specifies an interface between an application object of the target application and the business object, the ODA project and the adapter project sharing the metadata.

18. The method of claim 17, wherein the hub server is an International Business Machines Corporation ("IBM") Websphere Business Integration ("WBI") InterChange Server.

19. The method of claim 17, wherein the metadata specifies the target application and the hub server for the ODA project and the adapter project.

20. The method of claim 17, further comprising generating ODA source code from the ODA project.

21. The method of claim 20, further comprising building and exporting a run-time ODA from the ODA source code and debugging the run-time ODA.

22. The method of claim 21, further comprising generating adapter source code from the adapter project.

23. The method of claim 22, further comprising building and exporting a run-time adapter agent from the adapter source code and debugging the adapter agent.

24. The method of claim 23, wherein the ODA source code and the adapter source code utilize a software language selected from Java and C++.

25. The method of claim 17, wherein the adapter agent is a J2EE Java 2 platform Enterprise Edition connector.

* * * * *